(12) United States Patent
Canty et al.

(10) Patent No.: US 7,178,679 B2
(45) Date of Patent: Feb. 20, 2007

(54) RACK-MOUNTABLE CABLE MANAGER

(75) Inventors: Mark E. Canty, Aurora, IL (US); Michael J. McGrath, New Lenox, IL (US); Thomas Chung Yin Wong, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 252 days.

(21) Appl. No.: 10/767,389

(22) Filed: Jan. 28, 2004

(65) Prior Publication Data

US 2004/0226900 A1 Nov. 18, 2004

Related U.S. Application Data

(63) Continuation-in-part of application No. 10/384,307, filed on Mar. 7, 2003, now Pat. No. 7,000,784.

(51) Int. Cl.
*A47F 7/00* (2006.01)
(52) U.S. Cl. ..................................... 211/26
(58) Field of Classification Search .................. 211/26, 211/85, 71.01, 189; 361/826
See application file for complete search history.

(56) References Cited

U.S. PATENT DOCUMENTS

| | | | | |
|---|---|---|---|---|
| 2,921,607 | A | * | 1/1960 | Caveney ..................... 138/106 |
| 3,126,444 | A | * | 3/1964 | Taylor ........................ 174/101 |
| 4,640,314 | A | * | 2/1987 | Mock ......................... 138/162 |
| 4,697,720 | A | * | 10/1987 | Hotchkiss et al. ........ 174/138 F |
| 4,898,550 | A | * | 2/1990 | Ayer .......................... 439/718 |
| 5,024,251 | A | * | 6/1991 | Chapman .................... 138/92 |
| 5,709,249 | A | * | 1/1998 | Okada et al. ............... 138/162 |
| 5,728,976 | A | * | 3/1998 | Santucci et al. ............ 174/135 |
| 6,107,576 | A | * | 8/2000 | Morton et al. .............. 174/101 |
| 6,437,243 | B1 | * | 8/2002 | VanderVelde et al. ..... 174/68.3 |

\* cited by examiner

*Primary Examiner*—Sarah Purol
(74) *Attorney, Agent, or Firm*—Robert A. McCann; Christopher S. Clancy

(57) ABSTRACT

An integrally molded cable manager for routing cables wherein the cable manager is generally enclosable by a cover. The integrally molded cable manager includes a generally rectangular base portion and a pair of side wall portions generally perpendicular to the base portion along the longer sides of the generally rectangular base portion, each of the side wall portions having a plurality of generally aligned fingers. At least two fingers of each of the side wall portions include a hook protrusion for cooperating with the cover to permit the cover to be alternately rotatable relative to either of the side wall portions.

3 Claims, 21 Drawing Sheets

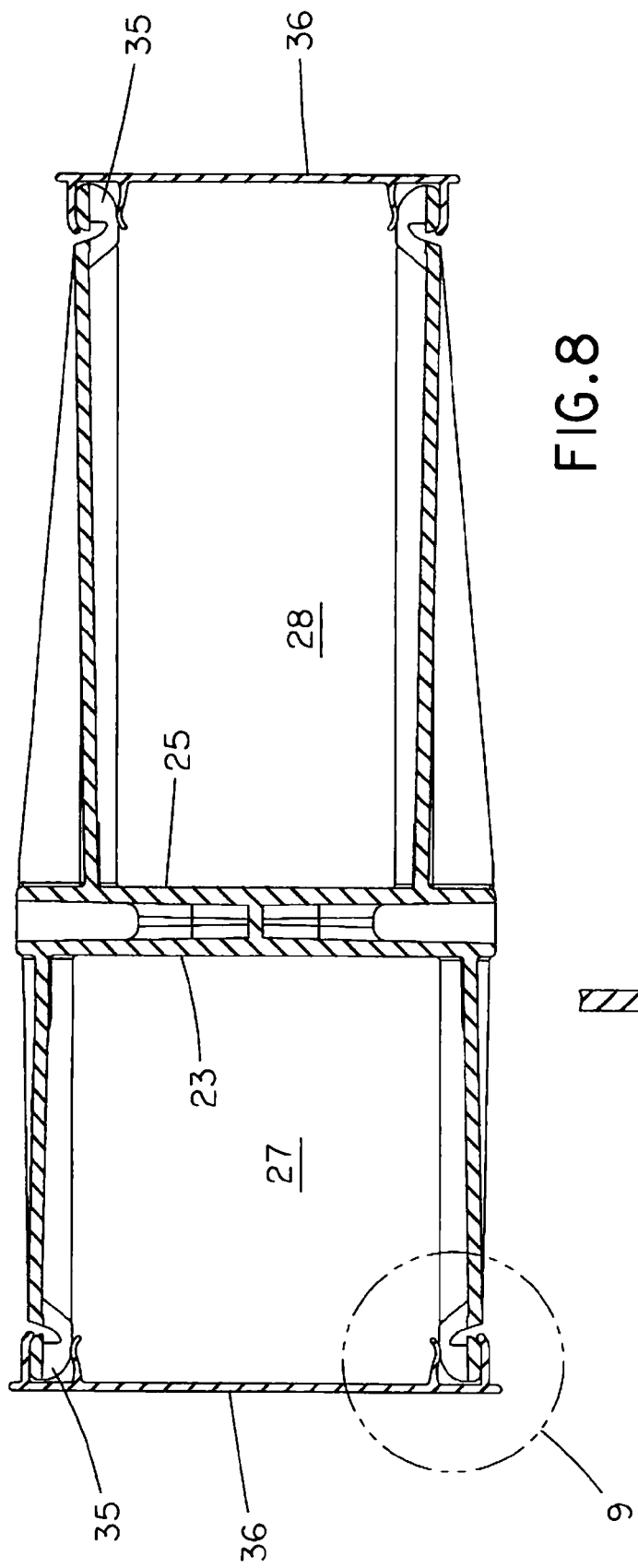
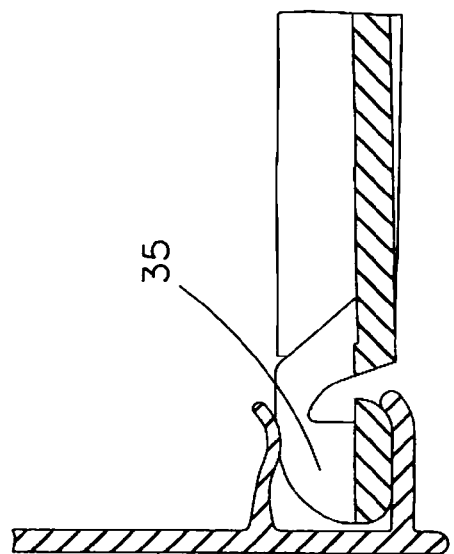

RACK-MOUNTABLE CABLE MANAGER

CROSS-REFERENCE TO RELATED APPLICATIONS

This is a continuation-in-part application of U.S. patent application Ser. No. 10/384,307, filed Mar. 7, 2003 now U.S. Pat No. 7,000,784.

BACKGROUND OF THE INVENTION

As the telecommunications arena continues to proliferate, so does a corresponding need to more efficiently route and manage associated cabling. Networks are requiring more and more racks of electrical equipment, even as network racks are becoming more densely populated with electrical components, and the electrical components are becoming more densely populated with ports for incoming and outgoing cables. As the resulting number of pathways and connections grows and the available space within the rack environment diminishes, the safe and efficient routing of cables to and from the electrical components becomes essential.

Network racks have historically employed one or more different kinds of cable management apparatus for routing and managing dense cabling. D-rings and other single-point supports tend to be relatively inexpensive and may provide significant routing flexibility, but they may lack the strength to support large volumes of cabling, especially while maintaining a predetermined minimum bend radius, and may complicate the re-routing of specific cables. Channel-type managers made primarily of formed and punched sheet metal may be stronger and have greater capacity, but may also be heavy and costly to manufacture, and, without costly coining or other processing, may present sharp edges not ideal for copper wire or fiberoptic applications. Extruded plastic channel-type managers, while generally less expensive than their sheet metal counterparts, tend to be weaker, and, especially when further weakened by slotting or other accommodation to routing flexibility, may deleteriously sag when subjected to larger cabling loads. An example of an extruded duct having cable managing capability is seen in U.S. Pat. No. 3,485,937. Composite managers, multiple-piece assemblies that may include extruded and punched, molded, formed, coined and other types of components, may have various performance advantages, based on the specific combination of components, but tend to be more costly due to the need to assemble the respective components. Published U.S. patent application US2001/0031124 A1, for example, discloses a cable manager formed by an injection molding process in which two identical individually molded halves are subsequently assembled by snap fitting the two pieces together.

As such, there is a need in the telecommunications industry for a strong, less costly rack-mountable cable manager for managing and routing cables on a network rack that provides high capacity and good routing flexibility, while maintaining safe contact points and minimum bend radii suitable for wire and fiberoptic applications.

SUMMARY OF THE INVENTION

To address the above-described shortcomings of existing rack managers, an integrally molded rack-mountable manager, as described and claimed below, is provided. Because it is integrally molded, the rack manager of the present invention requires no subsequent assembly of components. Because it is made from a thermoplastic rather than sheet metal, the manager of the present invention may be less expensive and lighter, while still being strong. Compared to the relatively inexpensive extruded cable-routing devices, the integrally molded manager of the present invention may be stronger and may have a more sophisticated structure, potentially permitting greater capacity and routing flexibility while providing safer contact points for fiberoptic cables.

To permit an integrally molded object, such as a rack manager in accordance with the present invention, to have a sophisticated three-dimensional shape, a simple two-piece mold is sometimes insufficient. In particular, since one side of such a mold must be pulled away from the other in order to free the molded part, one must prevent the die being removed from catching on the molded product. Thus it is contemplated that a rack manager in accordance with the invention would preferably be integrally molded by a method that employed multiple dies that would be individually movable in distinct directions from the base die(s) holding the molded piece. In this way, one can integrally mold a rack manager having a more sophisticated structure without requiring any subsequent component assembly.

The invention therefore also includes a method for manufacturing a rack-mountable manager. The method includes the following steps: providing a plurality of first dies on a first side of a part line, providing a second die on a second side of the part line, injecting a moldable material between the plurality of first dies and the second die to form the shape of a rack-mountable manager, cooling the moldable material so that it hardens into the shape of a rack-mountable manager, withdrawing a predetermined one of the plurality of first dies in a first direction, withdrawing a predetermined other of the plurality of first dies in a second direction not parallel to the first direction, and removing the rack-mountable manager from the second die.

BRIEF DESCRIPTION OF THE FIGURES

FIG. 8 is a cross-sectional view of the manager of FIG. 2 taken across the line 8—8 in FIG. 2;

FIG. 9 is a close-up view of a front corner hinge portion of FIG. 8;

DETAILED DESCRIPTION OF PREFERRED EMBODIMENTS

Disclosed and claimed herein is an integrally molded rack-mountable manager for managing the routing of cables along a network rack supporting electrical components. Because it is integrally molded, the rack manager of the present invention requires no subsequent assembly of components. Because it is made from a thermoplastic rather than sheet metal, the manager of the present invention may be less expensive and lighter, while still being strong. Compared to the relatively inexpensive extruded cable-routing devices, the integrally molded manager of the present invention may be stronger and may have a more sophisticated and intricate structure, potentially permitting greater capacity and routing flexibility while providing safer contact points for copper wires or fiberoptic cables.

Figure 1:
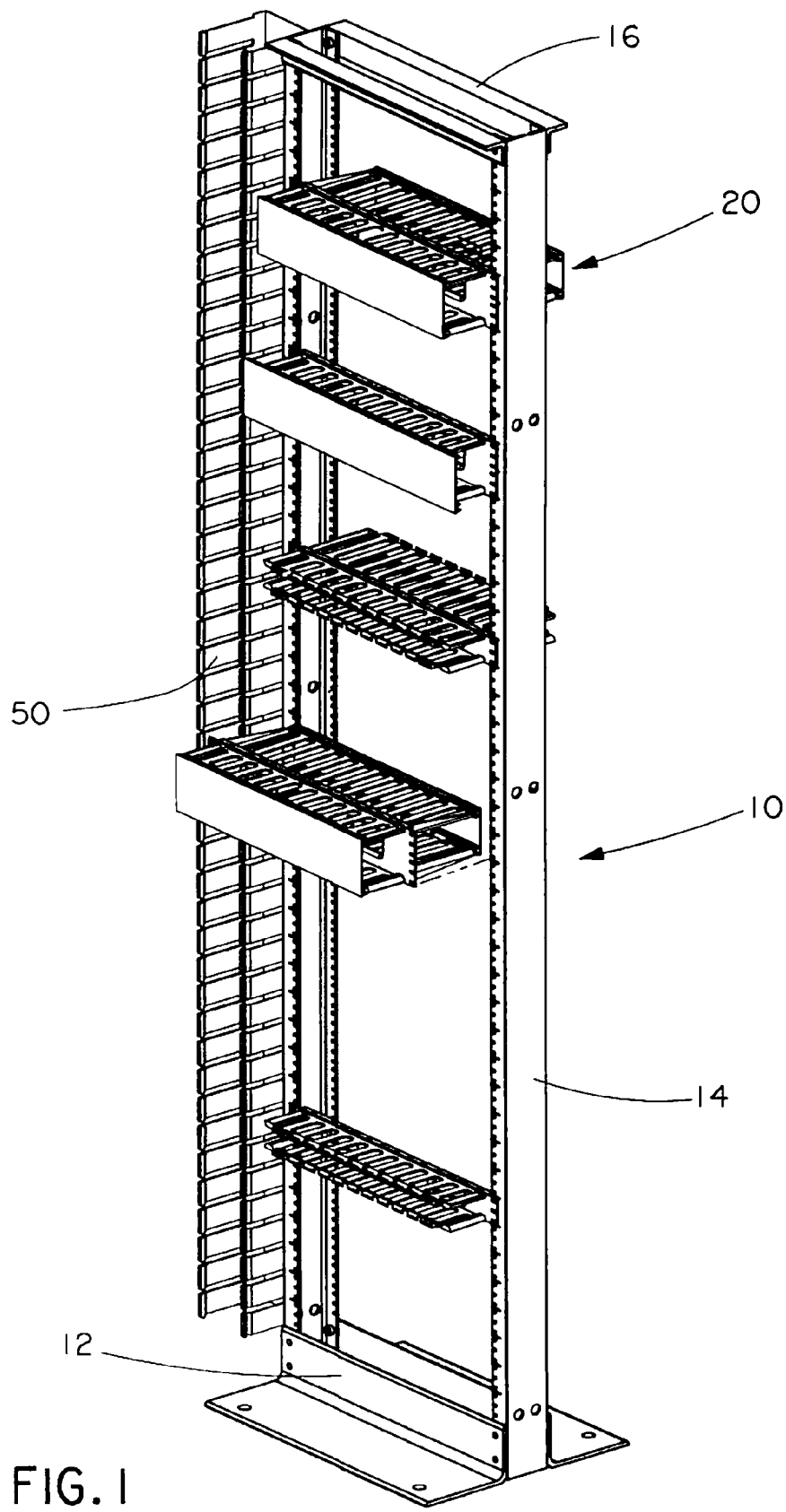
FIG. 1 is a front upper right perspective view of a network rack carrying various managers representing distinct embodiments of the invention.

As seen in FIG. 1, electrical components are shown on a typical rectangular network rack 10. The rack includes a base 12, a vertical support 14 upstanding from each end of the base, and a top support 16 extending between the ends of the vertical supports remote from the base. Such a rack might typically be 19 inches across.

Figure 2:
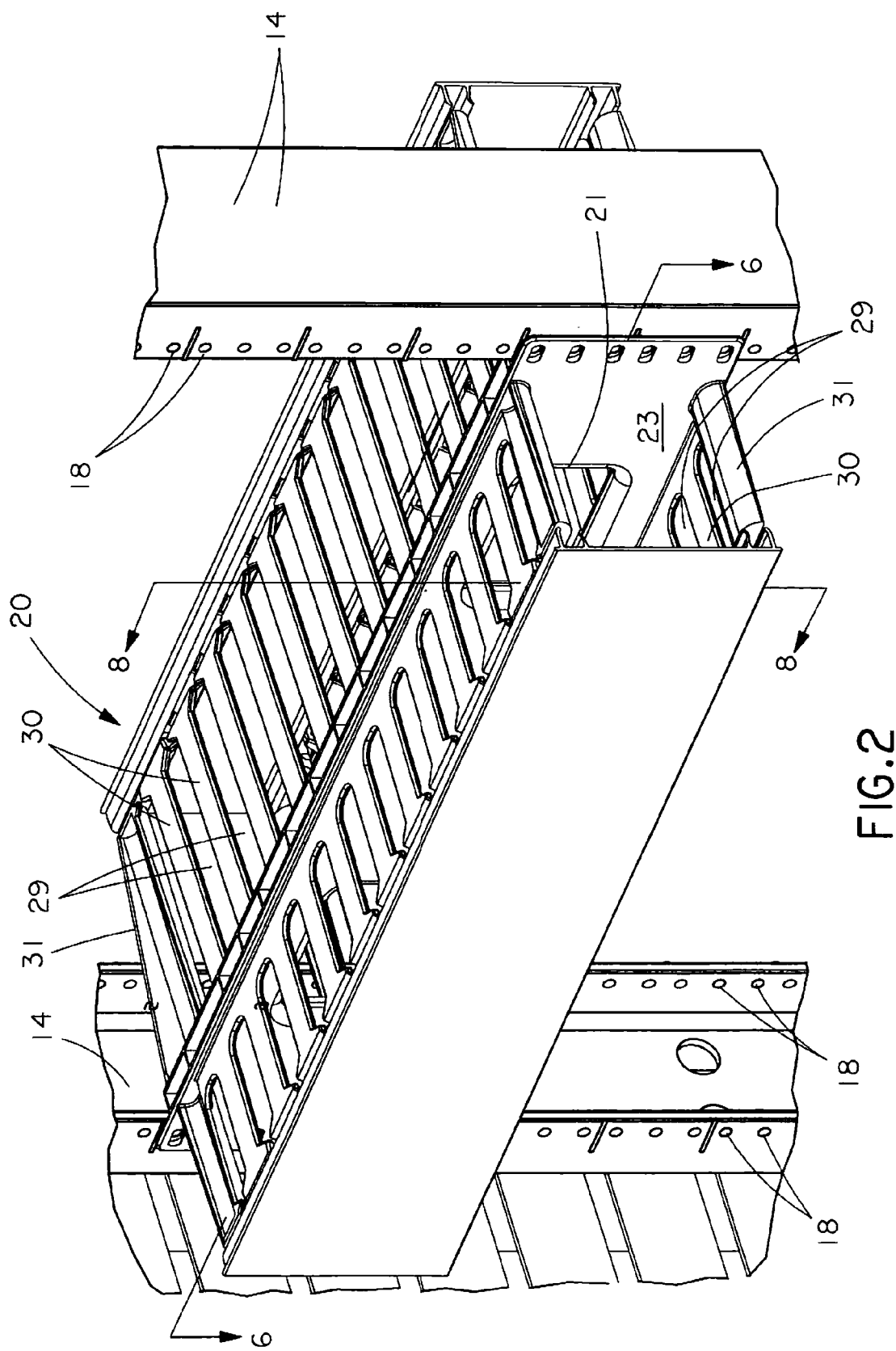
FIG. 2 is a front upper right perspective view of a horizontally disposed two-sided manager in accordance with an embodiment of the invention positioned for mounting on a network rack wherein the manager is covered on both sides.
Figure 3:
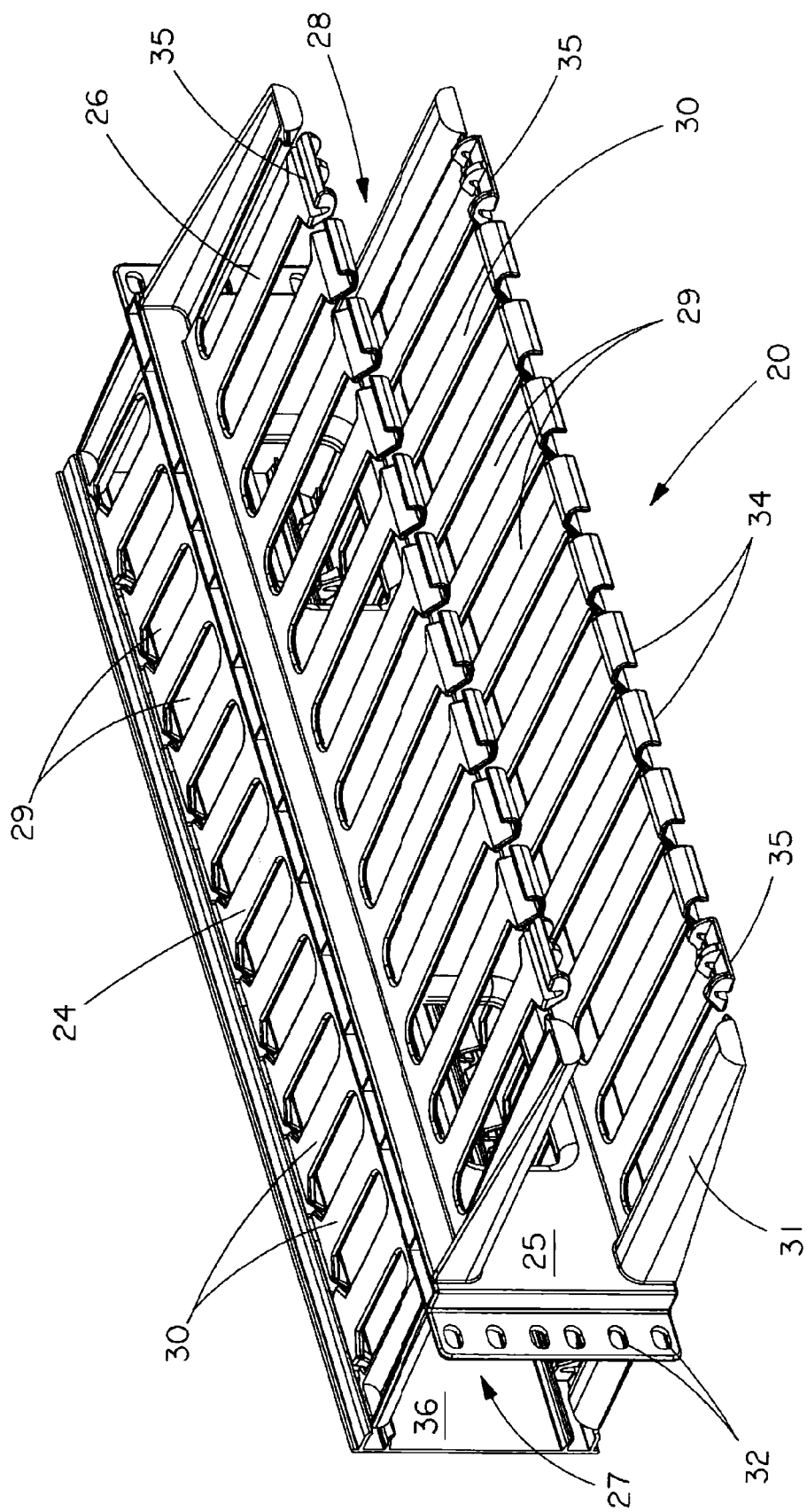
FIG. 3 is a rear upper right perspective view of the manager of FIG. 2 wherein the rear cover is removed.
Figure 4:
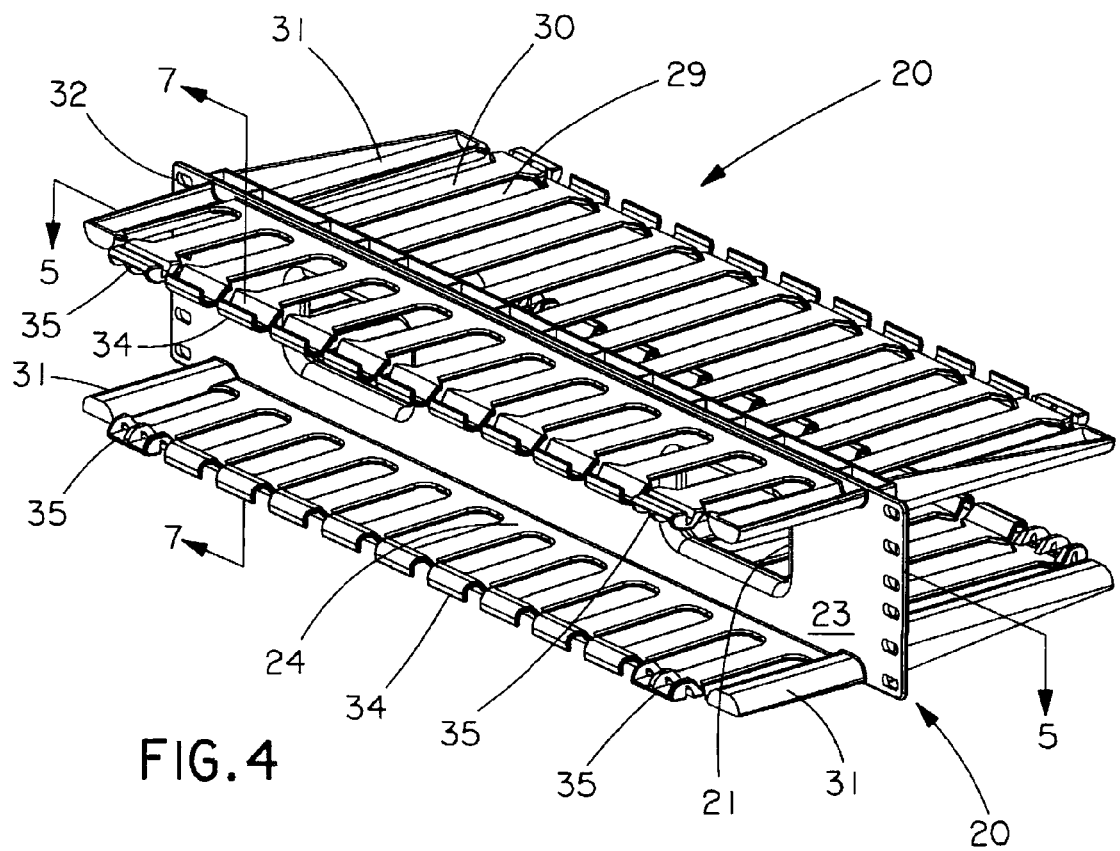
FIG. 4 is a front upper right perspective view of the manager of FIG. 2 wherein the covers and network rack are removed to more clearly show particular features of the manager.
Figure 5:
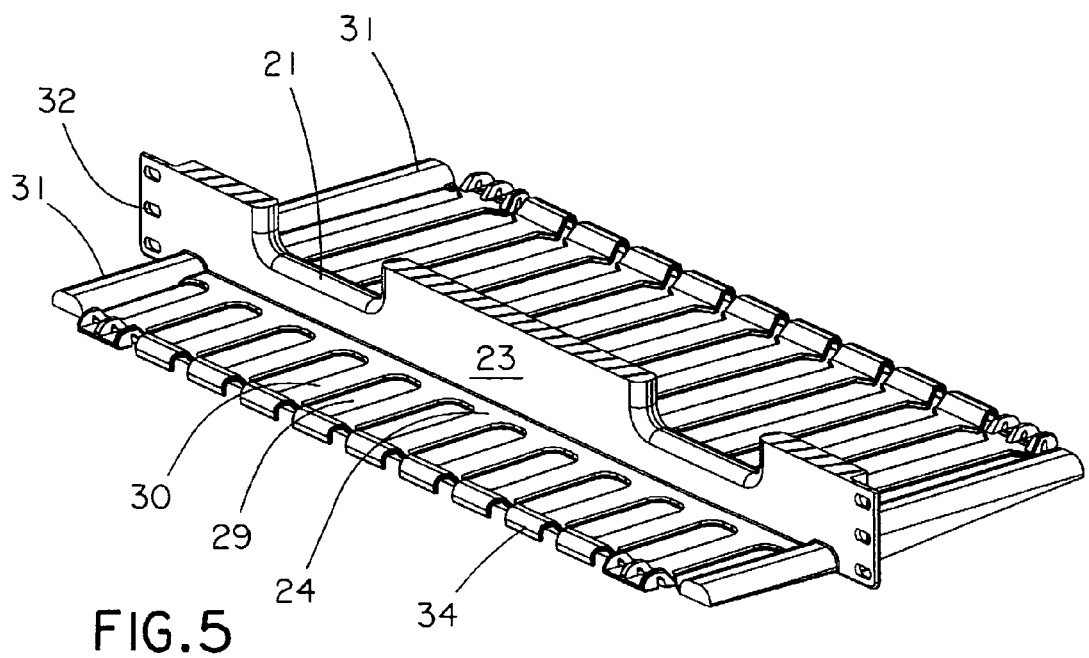
FIG. 5 is a perspective sectional view of one-half of the manager of FIG. 4 taken along the line 5—5 in FIG. 4.
Figure 6:
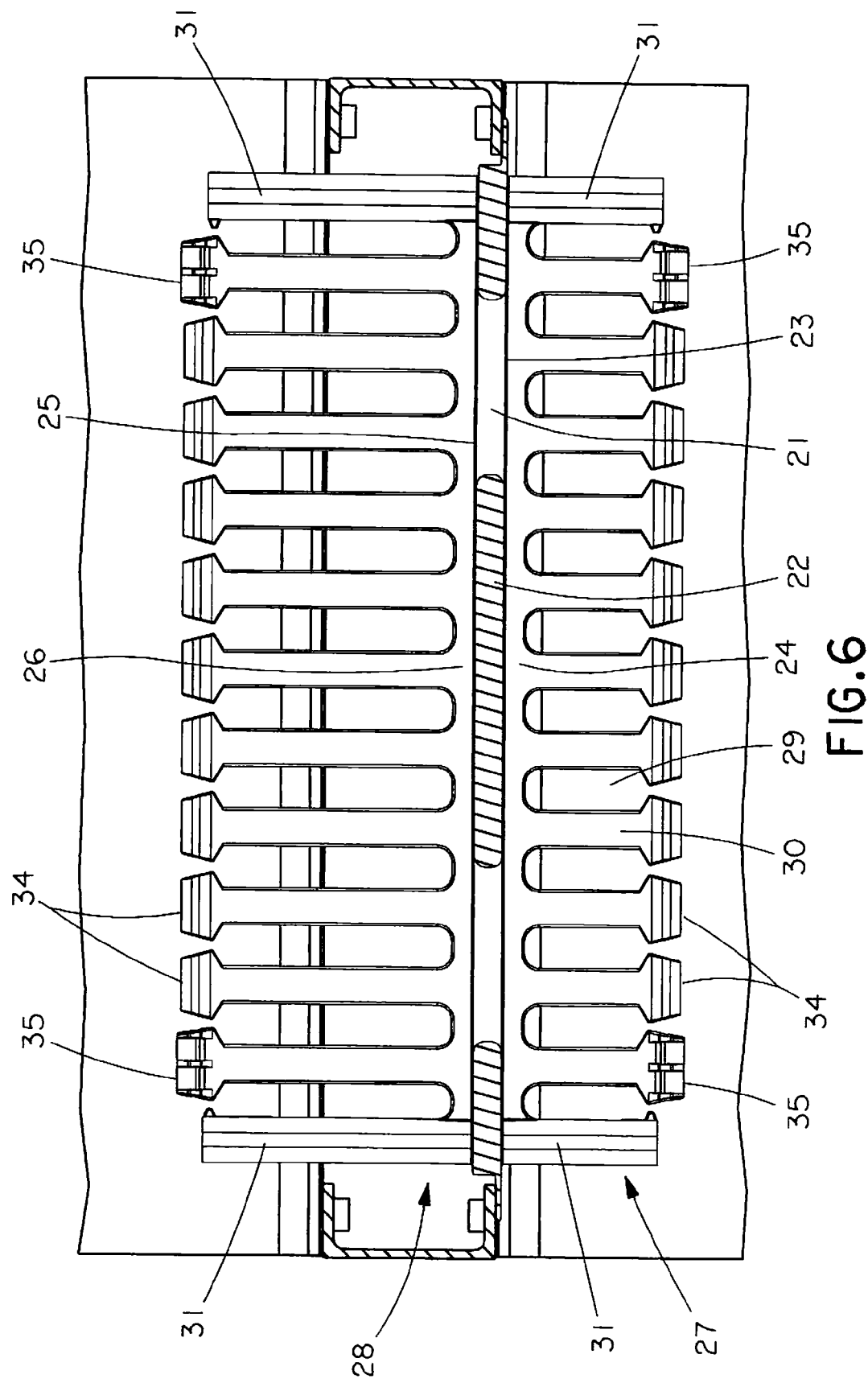
FIG. 6 is a top plan view of the manager of FIG. 2.
Figure 7:
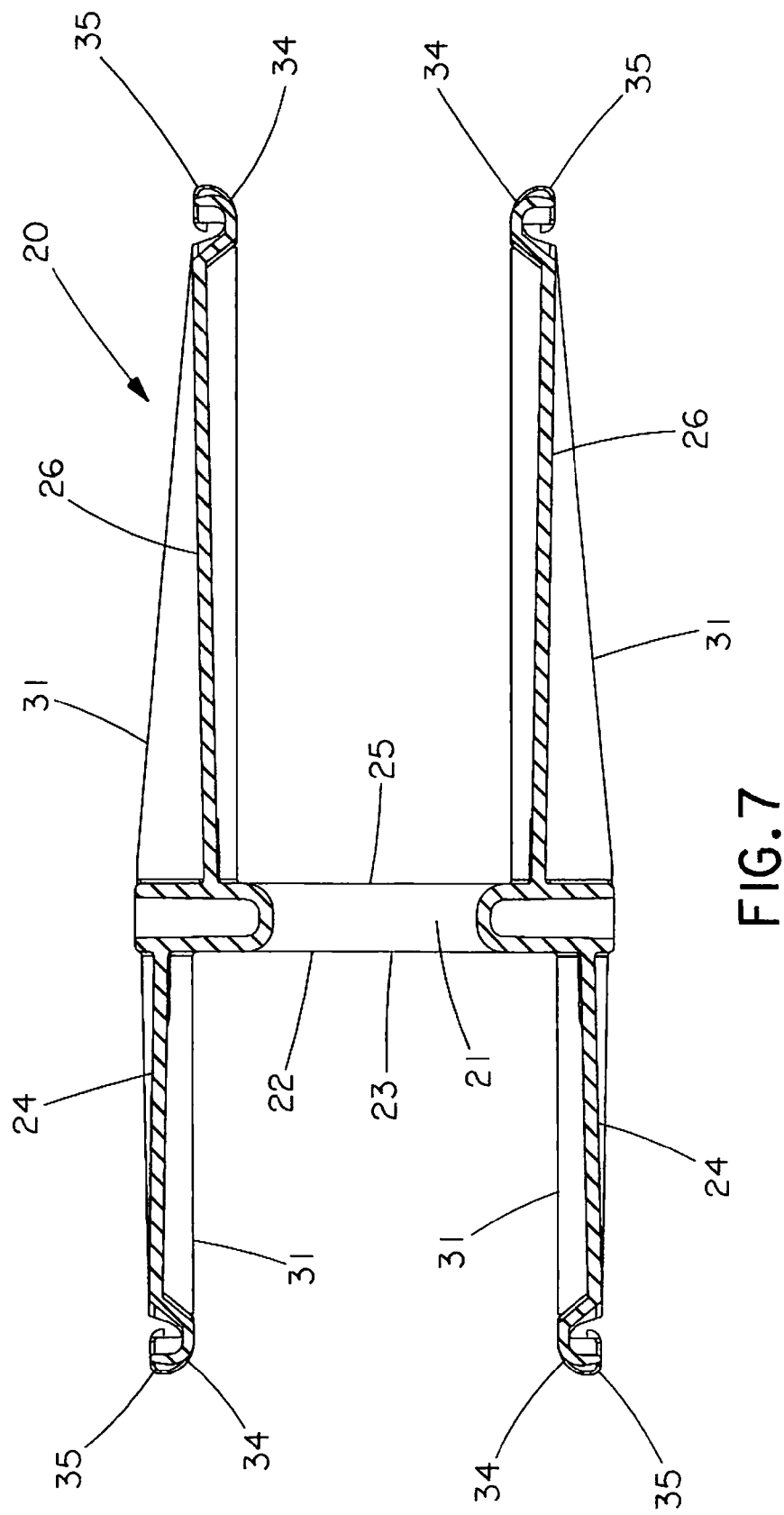
FIG. 7 is a cross-sectional view of the manager of FIG. 4 taken across the line 7—7 in FIG. 4.
Figure 10:
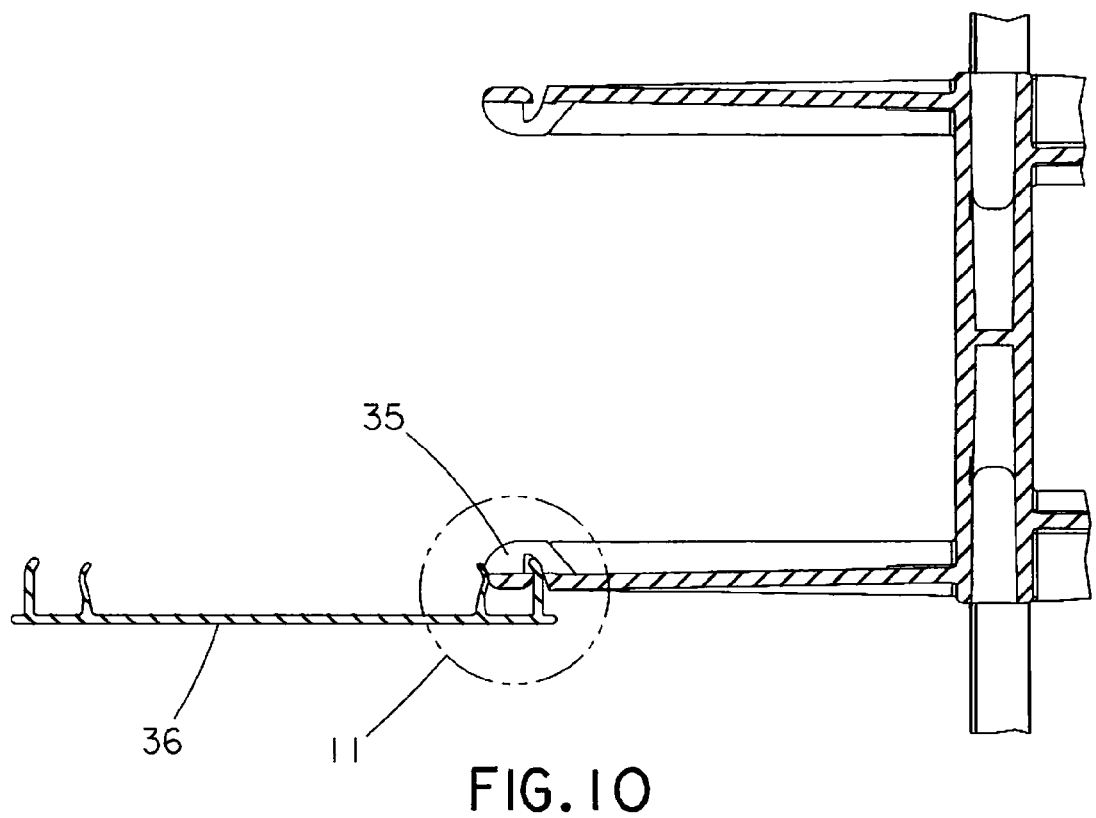
FIG. 10 is a close-up view of the front portion of the manager of FIG. 8 wherein the cover is rotated open.
Figure 11:
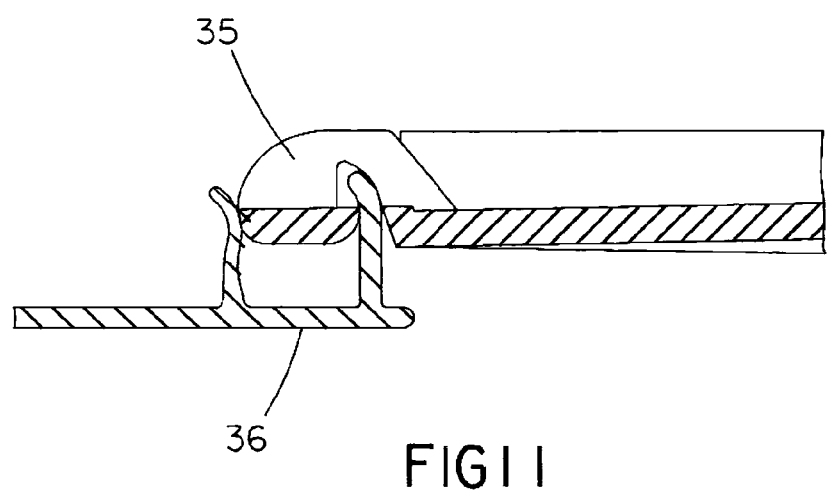
FIG. 11 is a close-up view of a front corner hinge portion of FIG. 10.

Electronic components, such as patch panels and the like, may be mounted on the rack 10 at one or more elevations using mounting holes 18 present on the vertical supports 14. As shown, for example, in FIG. 2, the rack may include numerical, linear, and/or other indicators corresponding to the spaced mounting holes to convey information, such as the height of the hole, to facilitate mounting electronic components and/or cable managers at the same height on opposite sides of the rack.

As seen in FIG. 1, mounted horizontally, i.e., to and between opposite vertical supports 14, is an integrally molded two-sided manager 20 in accordance with an embodiment of the invention. Such a horizontally disposed manager is primarily for routing and managing cables between the vertical supports and to and from ports on electrical components disposed above or below the manager on the rack. As seen in FIGS. 2–8, the two-sided manager 20 includes a base 22, a pair of front side walls 24 extending from a front surface 23 of the base, the front side walls 24 and base 22 defining a front channel 27. The two-sided manager 20 further includes a pair of rear side walls 26 extending from a rear surface 25 of the base 22, the rear side walls 26 and base 22 defining a rear channel 28. In this manner, front and rear channels, 27 and 28, are separated by the base 22. Depending upon the desired widths of the respective channels, or possibly depending upon molding considerations, the front and rear side walls may extend oppositely from roughly the same location on the base, or, if it is desired that one channel be wider than the other, one set of side walls may extend from the perimeter or a more remote portion of the base while the opposite set extends from a more centrally disposed site on the base. Similarly, depending upon space and capacity considerations, the height of the side walls or fingers may be adjusted, and the front and rear side walls may have differing heights. In a preferred embodiment, the rear side walls 26 are taller, i.e., extend further from the base 22, than the front side walls 24.

In a preferred embodiment, the base 22 includes one or more pass-through apertures 21 for allowing cables to pass between the front and rear channels. Preferably, the inner edge of each pass-through aperture presents a minimum bend radius so as to avoid deleterious contact with copper wires or fiberoptic cables. Though the base 20 is substantially planar in the embodiments shown and described herein, it may, within the scope of the invention, take another shape, especially for the purpose of making it mimic the shape of adjacent electrical components. Conforming the shape of the manager to, an adjacent patch panel, for example, may permit easier routing of the cables from the manager to a port on the component.

To facilitate the passage of cables from the manager 20 to adjacent electrical components or other routing apparatus, the front and rear side walls, 24 and 26, respectively, are preferably slotted. The slots 29 are best seen in FIGS. 2–6, and to avoid interference and facilitate changing the routing of individual or multiple cables within a manager, the slots are preferably at least as wide as the diameter of the cables being routed. Additionally, the internal edges of the slots preferably present a minimum bend radius to protect the copper wires or fiberoptic cables. In a preferred embodiment, the internal edges present a bend radius of approximately 0.04 or 0.05 inches. Molding, as opposed to extrusion, for example, is a better process for imparting precise bend radii. While the implementation of precise bend radii contemplates the routing and management of copper wires and fiberoptic cables primarily, other types of elongated flexible communications media could theoretically be similarly routed in accordance with the invention.

The slots 29 may simply be apertures within a contiguous side wall, but in the shown embodiment, the slots extend to the ends of the side walls remote from the base 22, thereby leaving the side walls 24 and 26 as multiply fingered. The fingers 30 are independently flexible, i.e, free to bend inwardly toward the center of the associated channel or outwardly away from the center of the associated channel, but still integrally form the respective side walls and are the product of an integral molding process that is discussed in detail below. The amount of flexibility depends on a number of factors, including the thickness of the side wall (and the finger particularly if a non-uniform wall thickness is employed) and the molding parameters, most notably the type of thermoplastic material utilized. The fingers 30 are preferably wider (i.e., narrower slot portion) nearer the ends of the side walls remote from the base 22. The wider portion helps retain routed cables within specific slots, while the flexibility of the individual fingers facilitates inserting particular cables into specific slots or removing them from specific slots to implement a reconfiguration of the network.

Depending upon desired characteristics of the manager, the inventive apparatus and method contemplate a considerable range of thermoplastics or other materials as potentially suitable for injection into the mold. The outermost fingers 31 on each side wall 24 and 26 may preferably include additional bend radius and strain relief structure as seen in the figures, as cables entering and exiting the manager are more likely to exert contact pressure on these fingers.

The spacing between slots is also contemplated to be variable within the scope of the invention, though it is recognized that particular advantages may accrue from a uniform spacing between slot center lines, especially wherein the spacing corresponds to the spacing between columns of ports on the adjacently disposed electrical components. For example, having a single slot of the manager exclusively serve a single column or an adjacent pair of columns on the component may minimize cable slack and yield an orderly cable arrangement that is pleasing to the eye and easier to reconfigure when necessary. In a preferred embodiment, for example, a manager has twelve slots disposed between thirteen fingers on each side wall, and the twelve slots are used to access twenty-four vertical columns of ports—each slot being used exclusively to access a particular adjacent pair of columns. When a similar manager is vertically disposed, as discussed below, a similar correspondence with rows of adjacent components is possible and beneficial. The term "rows" may generically mean rows or columns, depending upon whether one is considering a horizontal manager or a vertical manager.

As part of its integrally molded form, the manager 20 also includes configuration for specifically facilitating the mounting of the manager onto a rack 10. Seen clearly in FIG. 2, for example, in the embodiment shown therein, the base 22 extends laterally somewhat further than do the side walls 24 and 26, and includes mounting holes 32 that can be aligned with the mounting holes 18 of the rack. Screws, bolts, rivets, or equivalent fasteners therefore can be used to penetrate one or more pairs of aligned holes to mount the manager to the rack. Because the manager is integrally molded from a thermoplastic that is relatively more deformable than the metal rack, one can appropriately size the respective mounting holes 18 and 32, as well as the corresponding fasteners, to achieve an interference fit between the mounting holes 32 and the fasteners, thereby permitting one or more fasteners to hold the manager in place on the rack prior to full engagement thereof, thereby facilitating installation of the manager on the rack generally. By being directly mountable to the rack, the inventive manager avoids the need for a metal backplate to accomplish mounting, something that has been required in some prior designs.

Depending upon whether the side walls 24 and 26 are integral at their ends remote from the base or are preferably multiply fingered as discussed above, the remote ends of the side walls or the remote ends of the fingers are molded to include a simple curved lip 34 or a complex curved lip 35 that facilitates the removable attachment of a cover. In a preferred embodiment of the invention, both the front side wall 24 and the rear side wall 26, or the fingers 30 that comprise these walls, have such a complex curved lip such that a similar or identical cover could be used to cover either the front or rear channels. FIGS. 7–11 show the geometry of the complex curved lip 35 and the corresponding edge of a cover 36 in a preferred embodiment. The embodiment shown permits the cover to rotate about the lip(s) on either side of the associated channel between a closed position wherein the cover substantially covers the associated channel and inhibits unintentional and/or undesired contact with any cables routed therein and an open position wherein the cover does not substantially interfere with access to the cables routed therein. In the shown embodiment, the cover may rotate through an arc of approximately 110 degrees, and is releasably retainable in both the closed and open positions based on the geometry of the hinge, i.e., the interaction between the lip and the edge of the cover. The geometry of the hinge is similar to duct hinge embodiments disclosed in U.S. Pat. No. 6,437,244, the entire disclosure of which is incorporated herein by reference.

Unlike the hinge of the '244 disclosure, which is embodied in the edge of an extruded duct of uniform cross section, the present invention includes a hinge formed by a curved lip on an integrally molded piece. Since a molded piece does not have the constraint of being uniform in cross section, the present cable manager may be molded with the beneficial hinge construction formed into only particular fingers of the manager rather than requiring the hinge to occupy an entire edge, as is necessary with an extruded piece. For example, it has been found to be beneficial to include at least one finger having the curved lip geometry at or near each end of the cable manager on each side thereof. Such an arrangement is ascertainable from FIGS. 3, 4, 12, and 13. In such a design, the edge of the cover can engage the curved lip on each of the specially configured fingers (and any intermittent fingers with similar design if desired) to releasibly and rotatably attach the cover to the manager.

Figures 21, 22:
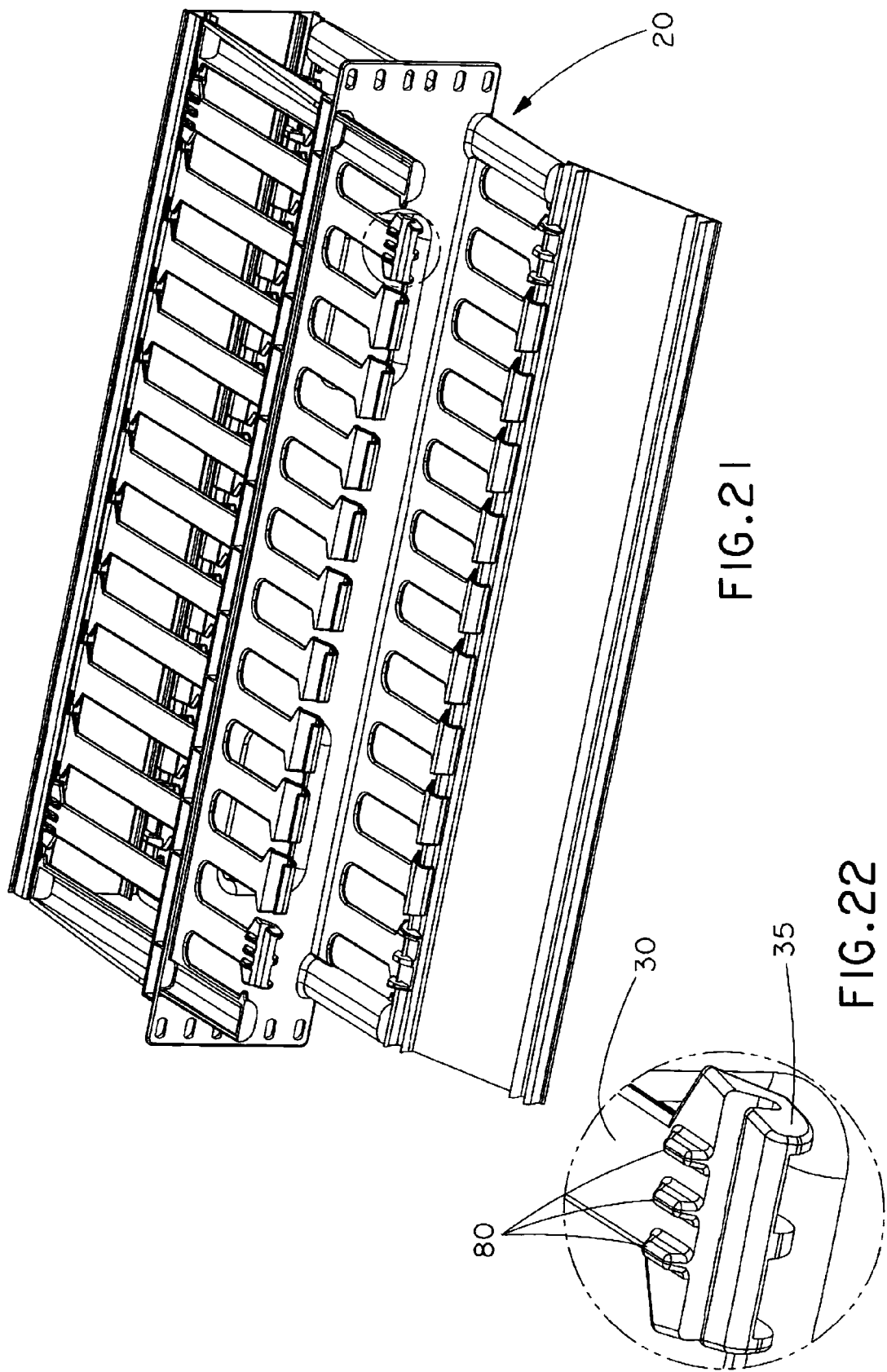
FIG. 21 is a front upper right perspective view of the manager akin to FIG. 4 wherein the covers are shown.
FIG. 22 is an enlarged view of the complex curved lip portion of a finger of the manager shown in FIG. 21.
Figure 23:
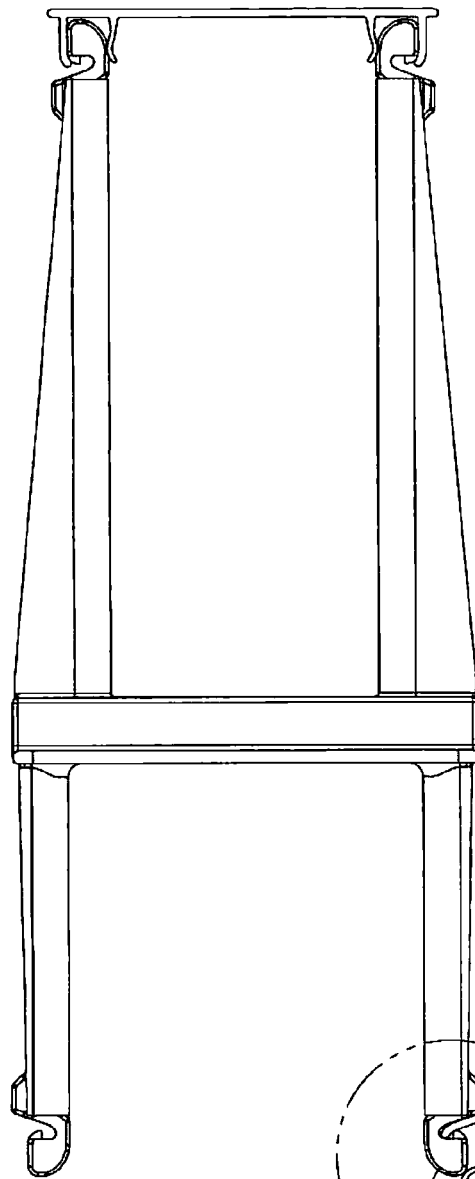
FIG. 23 is a right side view of the manager of FIG. 21 wherein a cover is rotated open off the front side thereof.

A preferred variation of the curved lip finger configuration for an integrally molded manager is shown in FIG. 22 and in less detail in FIGS. 21 and 23–26. It includes one or more support ribs 80 disposed near the complex curved lip of the specially configured fingers. In the embodiment shown in the figures, there are three support ribs. The ribs may strengthen the hinges on which they are present so that the plastic deforms or rotates less severely around the hinge than it might otherwise when subjected to torquing, such as when a cover is forcibly opened to its rotational limit. Because the fingers may preferably include cored-out portions 90 to facilitate the integral molding of the manager, the fingers may be vulnerable to deforming too much in the area when pressure is exerted on a fully opened cover, thereby permitting the edge of the cover to disengage from the complex curved portions of the specially configured fingers, resulting in unintended and undesirable separation of the cover from the manager.

Figure 25:
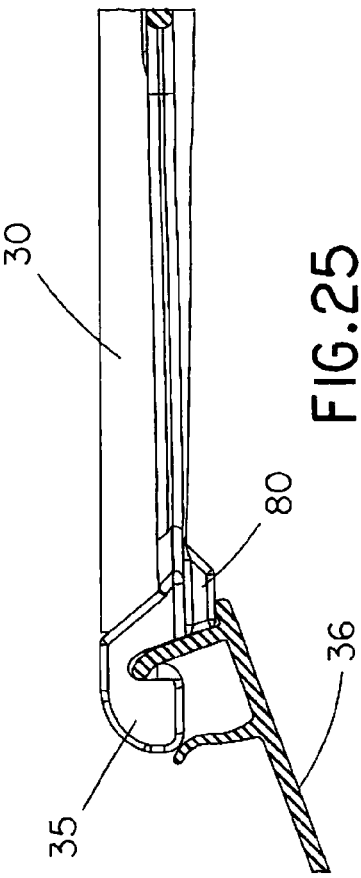
FIG. 25 is a right side cross-sectional view of the complex curved lip portion of a finger of the manager shown in FIG. 23.
Figure 24:
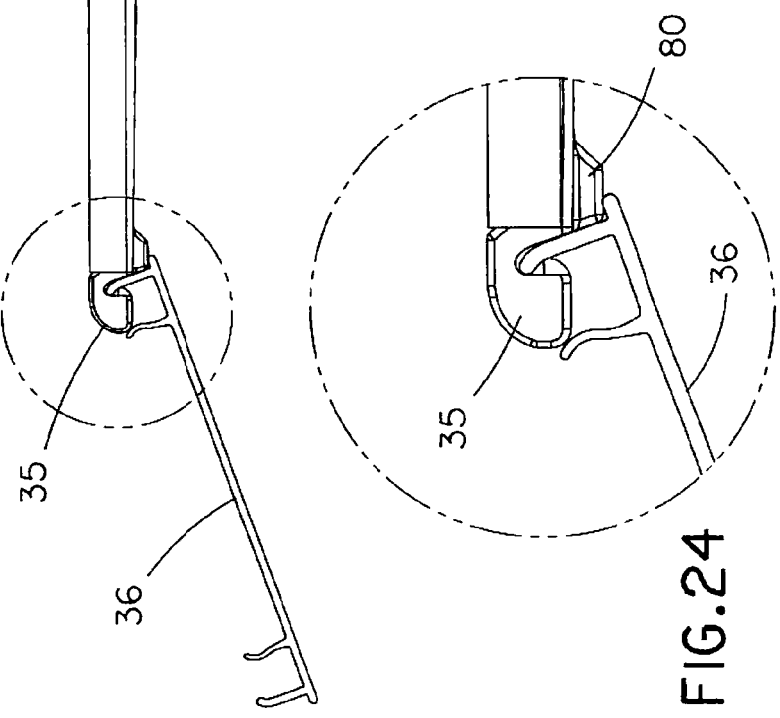
FIG. 24 is an enlarged view of the complex curved lip portion of a finger of the manager shown in FIG. 23.
Figure 26:
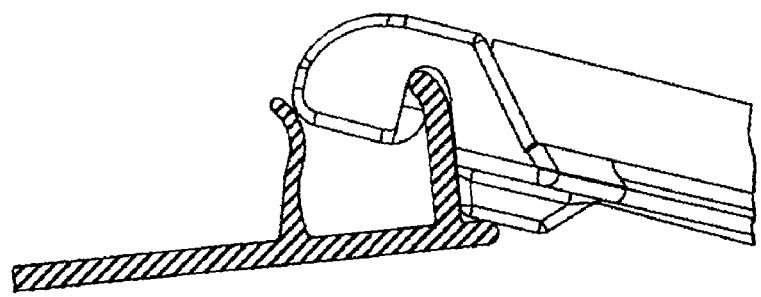
FIG. 26 is a view akin to FIG. 22 wherein the finger lacks support ribs.
Figure 27:
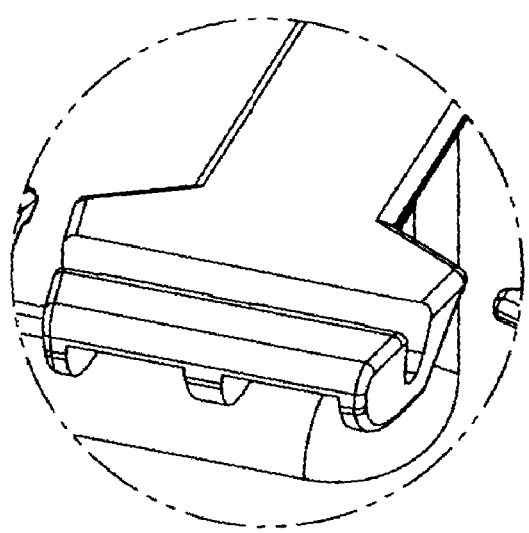
FIG. 27 is a view akin to FIG. 22 wherein the finger having the complex curved lip portion lacks ribs.

In addition to providing extra strength to the fingers, the ribs may preferably also provide additional contact area on the finger with the edge of the cover so that inadvertent disengagement of the cover is less likely. As seen in FIGS. 24–26, the ribs may thus move the pivot point to shorten the effective lever arm of the torquing force, and thereby lessen the torque actually applied at the hinge by a given opening force applied to the fully opened cover.

Having the manager's hinge be formed cumulatively by the ends of discrete fingers provides some advantages over the long continuous hinge necessitated by the uniform profile of extrusion. For example, it may be easier to apply the cover, remove the cover, and/or open and close the cover. The greater shape inconsistencies inherent in extruded pieces and greater contact surface between the cover and manager might make snapping the cover on or off the extruded piece more difficult. The extruded hinge may tend to provide additional frictional resistance to opening and closing the cover for much the same reason.

Figure 12:
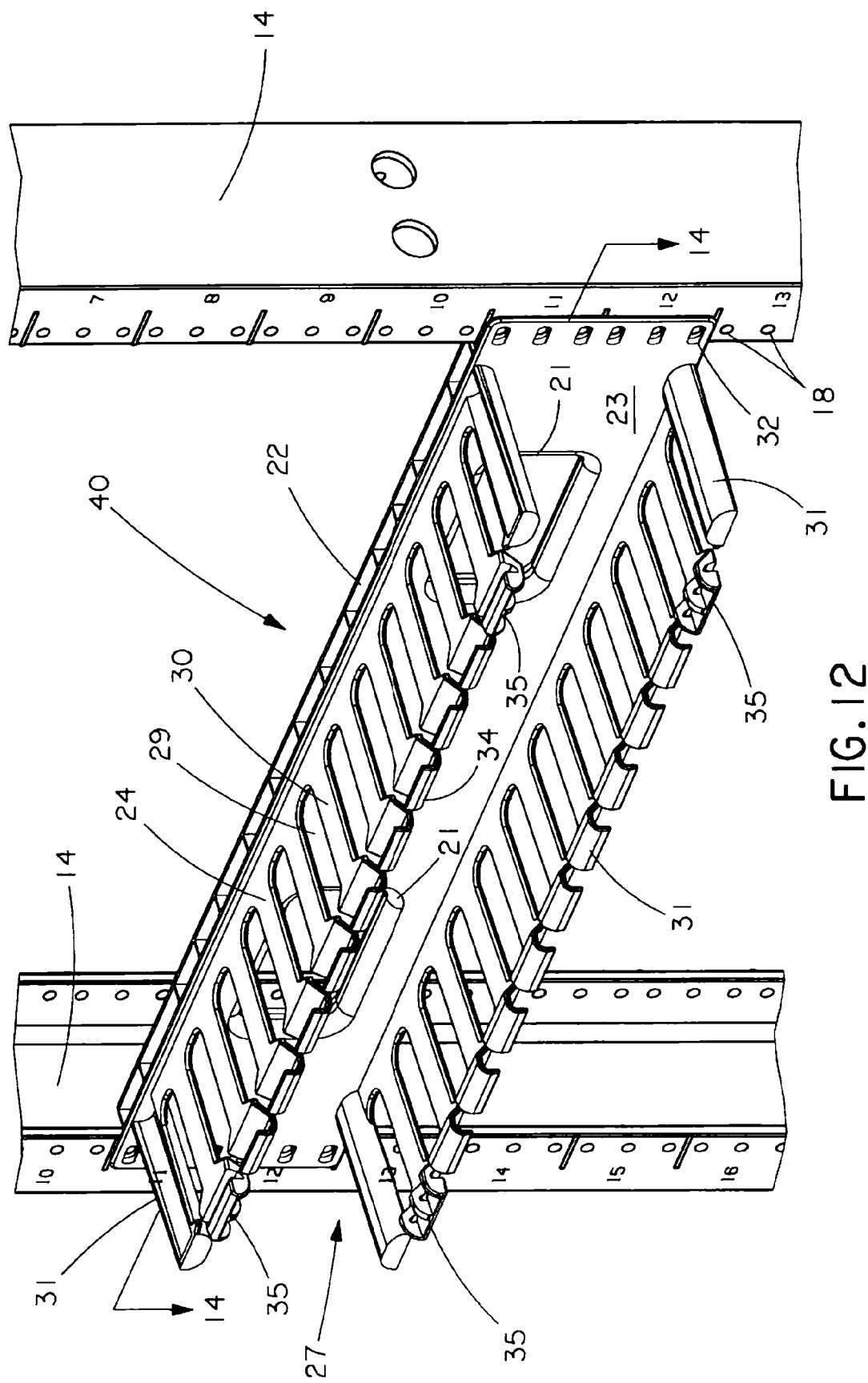
FIG. 12 is a front upper right perspective view of a horizontally disposed, uncovered one-sided manager in accordance with an embodiment of the invention positioned for mounting on a network rack.
Figure 12A:
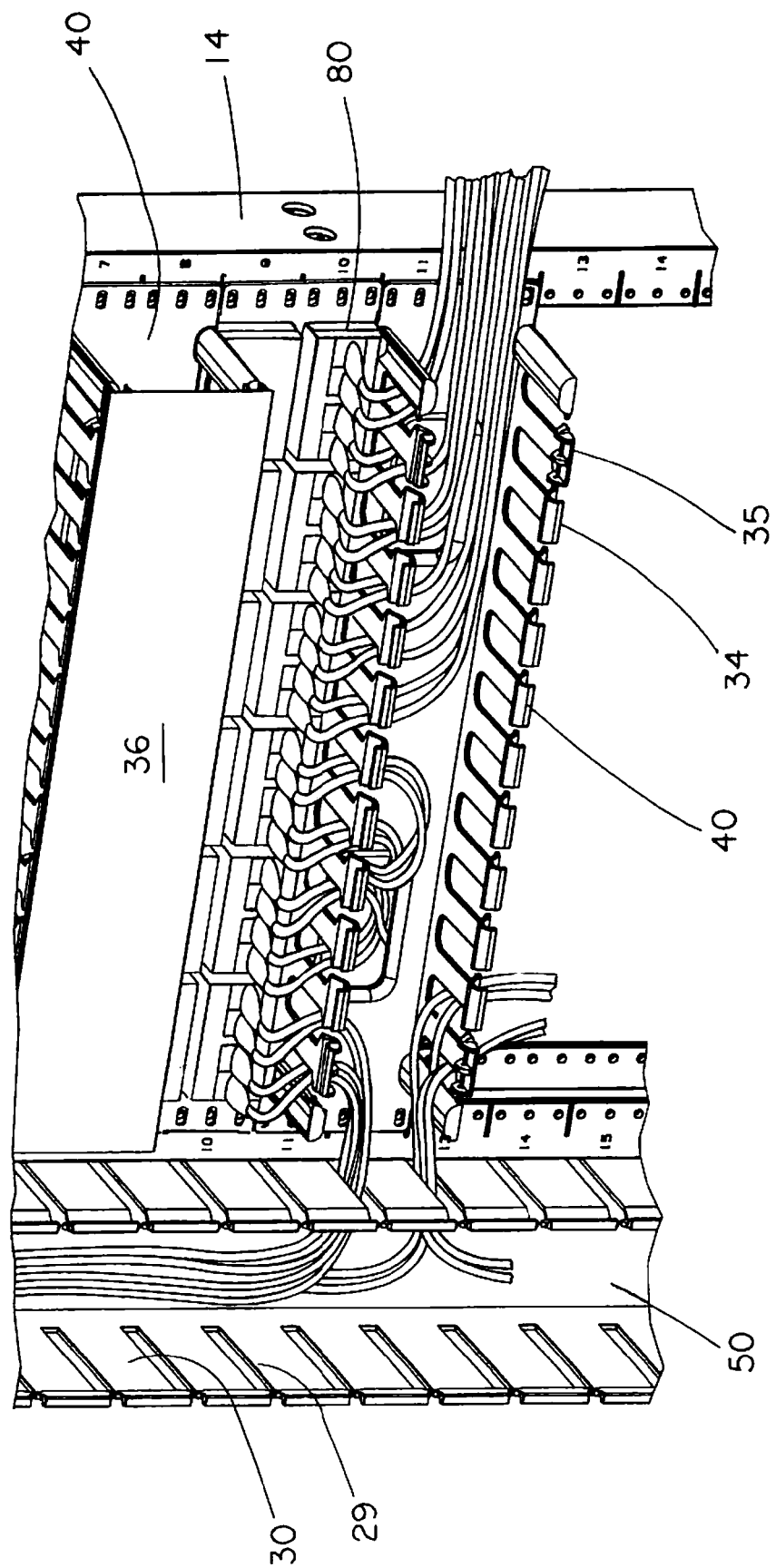
FIG. 12A is a view akin to that of FIG. 12 wherein cables are shown being routed through the manager to ports in an adjacent patch panel.
Figure 13:
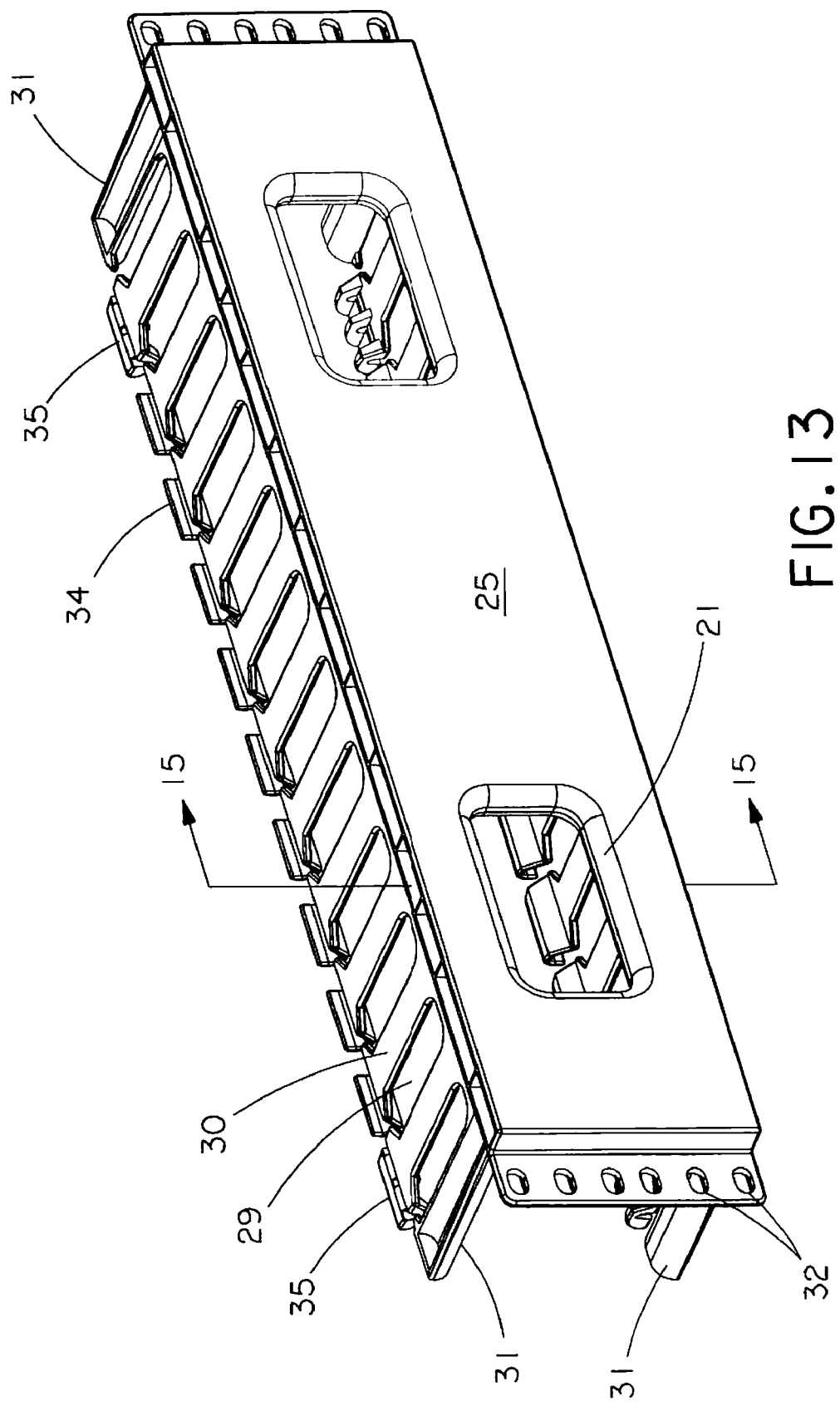
FIG. 13 is a rear upper right perspective view of the manager of FIG. 12 wherein the network rack is removed to more clearly show particular features of the manager.
Figure 14:
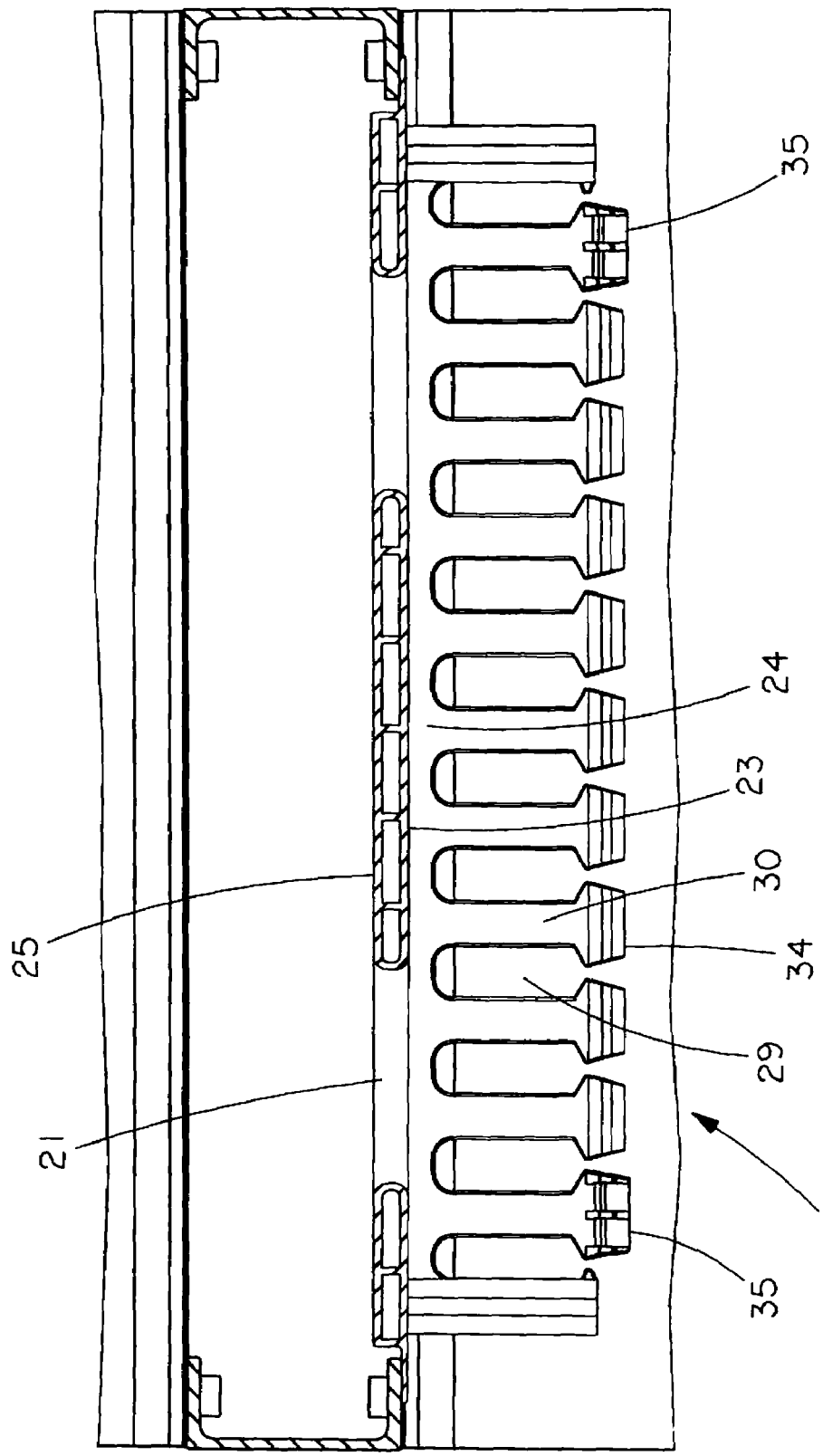
FIG. 14 is a cross-sectional view of the manager of FIG. 12 taken along the line 14—14 in FIG. 12.
Figure 15:
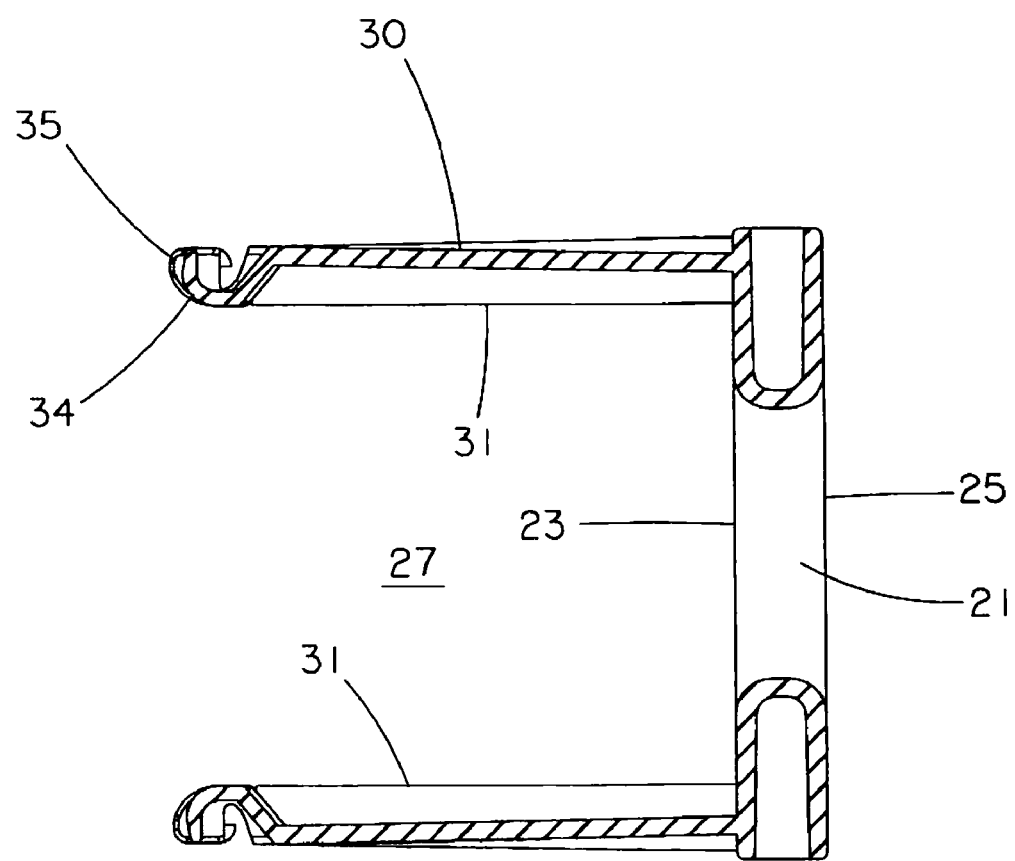
FIG. 15 is a cross-sectional view of the manager of FIG. 13 taken along the line 15—15 in FIG. 13.

A one-sided version of the inventive manager 40 is shown in FIGS. 12–15. The one-sided manager lacks the rear side walls 26 of the two-sided manager, and therefore lacks the defined rear channel 28 of the two-sided manager. It is intended for use with the same types of racks and is intended to be mounted in the same range of ways as is the afore described two-sided manager 20. FIG. 12A shows a typical environment of use on a network rack wherein the manager 40 routes cables from other routing apparatus, such as vertical manager 50, discussed below, to a patch panel 80 or another electrical component. Like two-sided managers, one-sided managers may be used in combination on the same rack as other one- and two-sided managers. Like each side of the two-sided manager, the distance from the centerline of the manager at which the side walls extend from the base determines the width of the channel, and the width, combined with the height of the channel (determined by height of side wall or fingers), determines the capacity of the channel.

Even without a rear channel being present, the base 22 may include one or more pass-through apertures 21 for allowing cables to pass rearwardly out of the channel or into the channel from the rear. As with the two-sided manager, though the base 20 of the one-sided manager is substantially planar in the embodiments shown and described herein, it may, within the scope of the invention, take another shape, especially for the purpose of making it mimic the shape of adjacent electrical components. For example, the base could be angled in its center to mimic the shape of the patch panel shown in published U.S. patent application US 2003/0022552 A1. Conforming the shape of the manager in this manner may permit easier routing of the cables from the manager to a port on the component.

Like the two-sided manager 20, as part of its integrally molded form, the one-sided manager 40 also includes configuration for specifically facilitating the mounting of the manager onto a rack 10. Also similarly, depending upon whether the side walls are integral at their ends remote from the base or are multiply fingered, the remote ends of the side walls or the remote ends of the fingers are preferably molded to include a lip that facilitates the removable attachment of a cover.

Referring back to FIG. 1, it may be seen that a manager 50 in accordance with the present invention may also be used in a primarily vertical orientation, such as along the long vertical supports 14 of the rack 10. Like with the horizontal embodiments, vertical managers may be one-sided or two-sided, and with the possible exception of mounting differences, may include any combination of the features discussed relative to the horizontal managers, such as covers releasably attachable and rotatable from both side walls, bend radii present on slots and pass-through apertures, etc. As with the horizontal managers, slots should be sufficiently large to accommodate at least the width of one standard cable, such as category 6 cable, therethrough.

Because the vertical manager 50 is mounted along a support 14 of the rack rather than spanning the space between two generally parallel vertical supports 14, it may require one of many conceivable mounting alternatives different from the mounting holes 18 shown and described above on the horizontal manager 20. It could include, for example, a similar mounting hole arrangement as is present on the horizontal manager wherein the mounting portion extends rearwardly from the base in general alignment with the side walls. With molded-in alignment holes present on such an extension that could be used to align with appropriately placed mounting holes on the vertical supports of the rack, the same kind of mounting could be realized for the vertical manager as is described above with the horizontal manager. The integrally molded vertical manager could alternatively, or even supplementally, in another preferred embodiment, be attached to the vertical support of the rack with appropriately shaped clips, brackets and/or other retention devices. Though the vertical manager 50 may extend for any length along one of the vertical supports of the rack, in a preferred embodiment it extends approximately the entire length of the support, i.e. from the base of the rack 12 to the top support 16 of the rack 10.

Due to its complex shape, shown and discussed above, one cannot generally mold the entire integral two-sided rack manager with a simple two-die mold, i.e., a stationary base die and moving die that is only linearly translatable toward and away from the base die. In particular, due the geometry of the manager 20, and especially due to the geometry of the cover-retaining lip, pulling two dies that form the entire mold directly apart would damage the molded piece still disposed within the mold. To integrally mold the two-sided manager shown and described above, therefore, a 6-die mold is preferably employed with a sequential withdrawal of individual or pairs of dies to permit the molded manager to be removed undamaged from the mold. The sequence is shown schematically in FIGS. 16–20.

Figure 16:
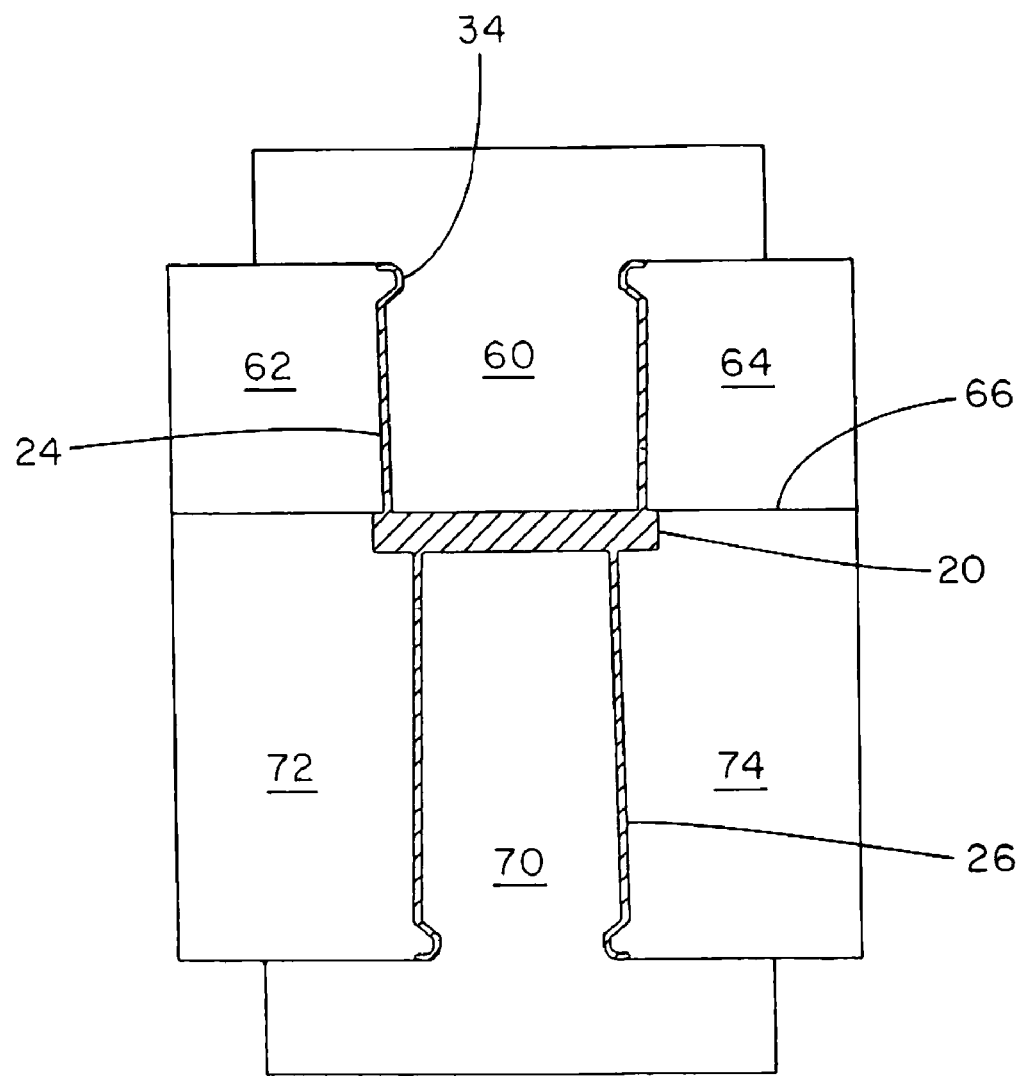
FIG. 16 is a schematic front view of a molded manager disposed within a mold in accordance with the invention prior to withdrawing any dies from the molded manager.
Figure 17:
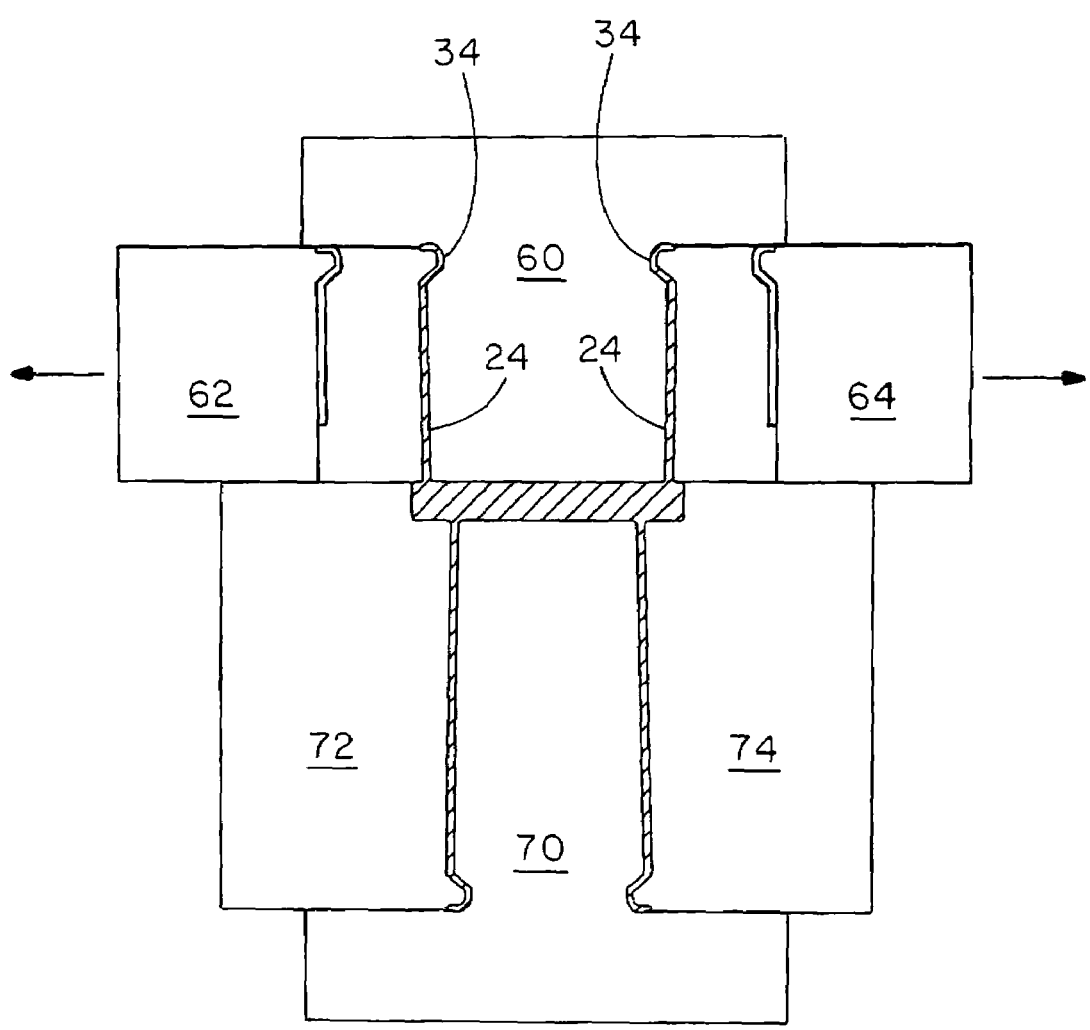
FIG. 17 is a view akin to that of FIG. 16 wherein the upper side dies have been horizontally withdrawn.

FIG. 16 schematically shows the molded manager 20 completely disposed within the mold in accordance with the invention prior to the withdrawal of any dies. The upper center die 60, the upper left die 62 and the upper right die 64 respectively meet the lower center die 70, the lower left die 72, and the lower right die 74 at the part line 66. The lower center die 70, in a preferred embodiment, may be a stationary die. The front side walls 24 of the manager 20 are substantially formed between the upper center and upper left dies and between the upper center and upper right dies, while the rear side walls 26 of the manager 20 are substantially formed between the lower center and lower left ides and between the lower center and lower right dies. The base of the manager is primarily formed between the upper and lower center dies, but also potentially between the upper and lower left dies and the upper and lower right dies.

Figure 18:
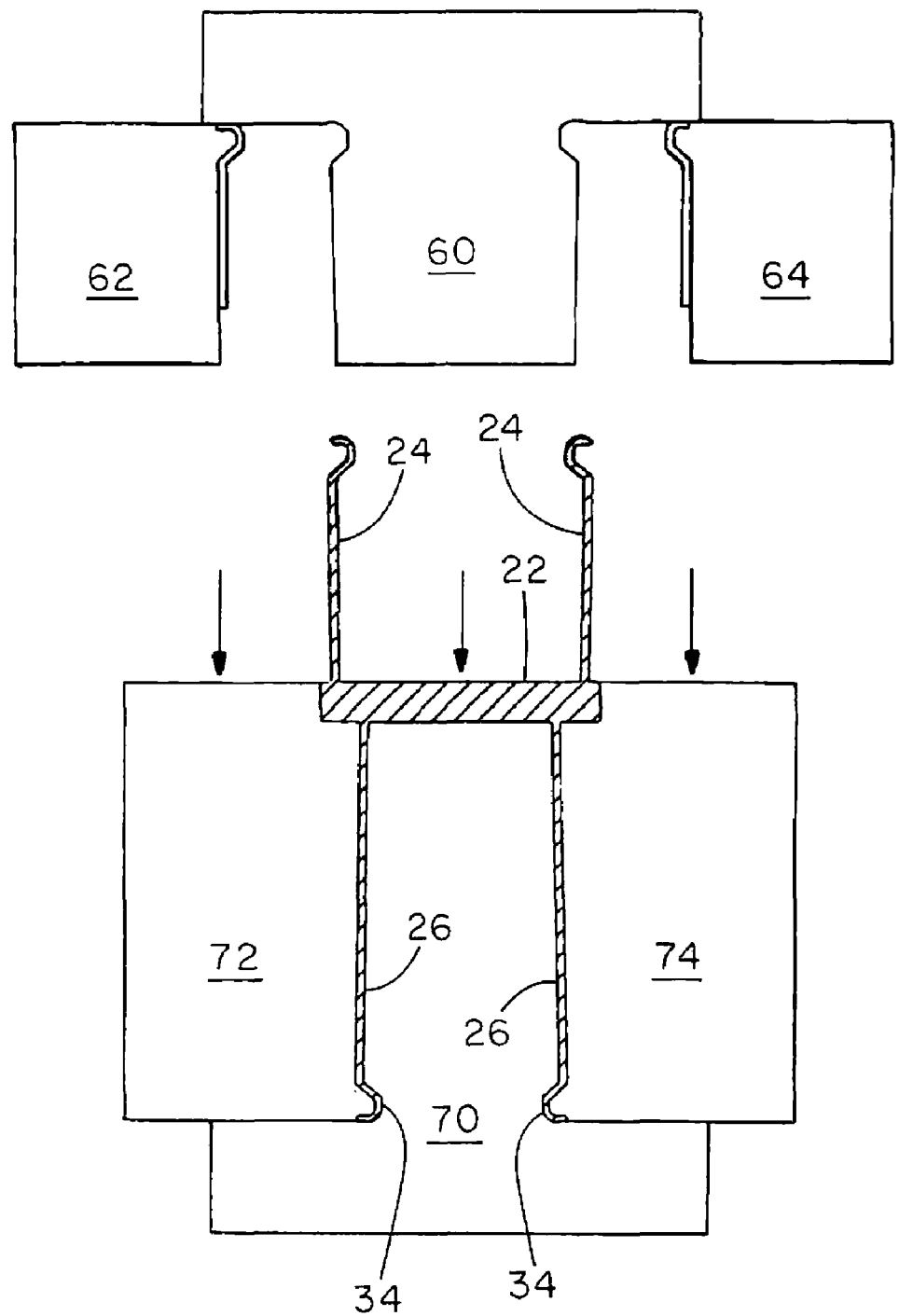
FIG. 18 is a view akin to that of FIG. 17 wherein all of the upper dies have been vertically withdrawn.

As can be seen in FIG. 16, if the three upper dies, 60, 62, and 64, were unitary, it would not be possible to withdraw the unitary die upwardly away from the part line without catching the curved lip portions 34 and 35 of the front side walls 24. Instead, because the upper portion of the mold has three separately movable dies, the upper left and upper right dies are first withdrawn laterally from the molded piece (FIG. 17), thereby giving the front side walls 24 clearance to deflect outwardly when the upper center die 60 (along with the other upper dies in the shown embodiment) is withdrawn upwardly from the part line 66 (FIG. 18).

Figure 19:
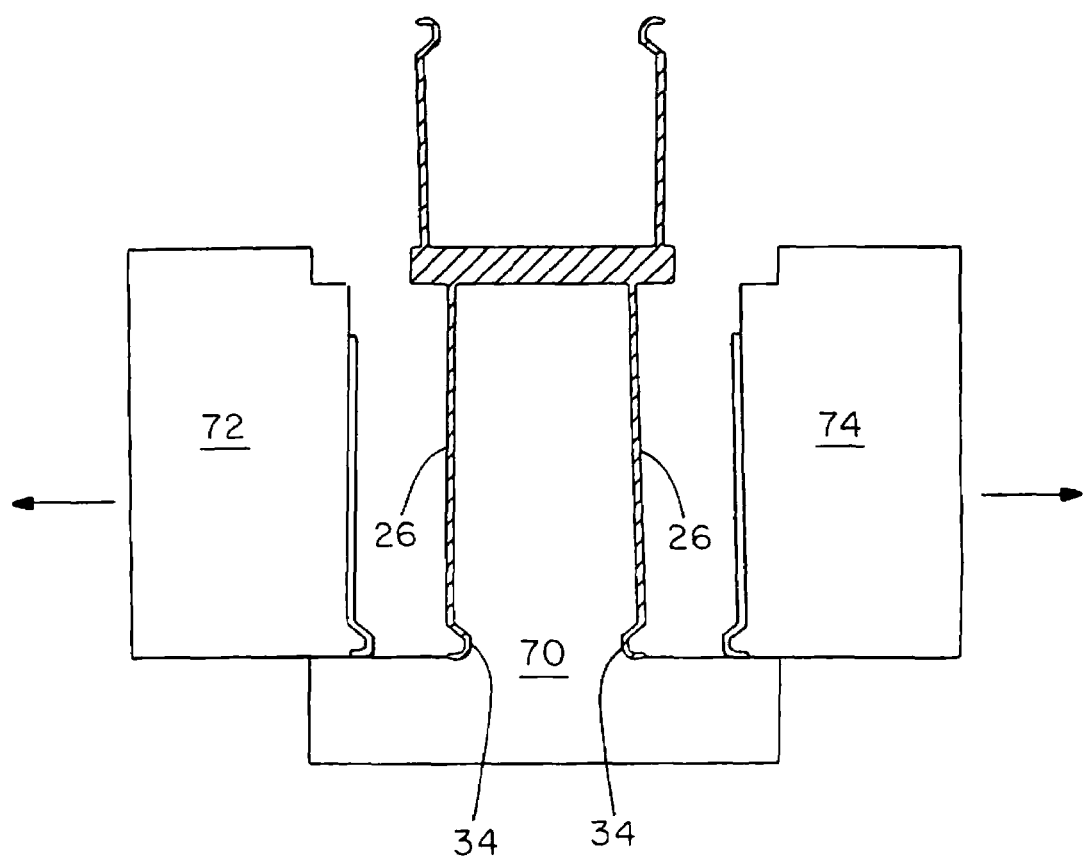
FIG. 19 is a view akin to that of FIG. 18 wherein the lower side dies have been horizontally withdrawn.
Figure 20:
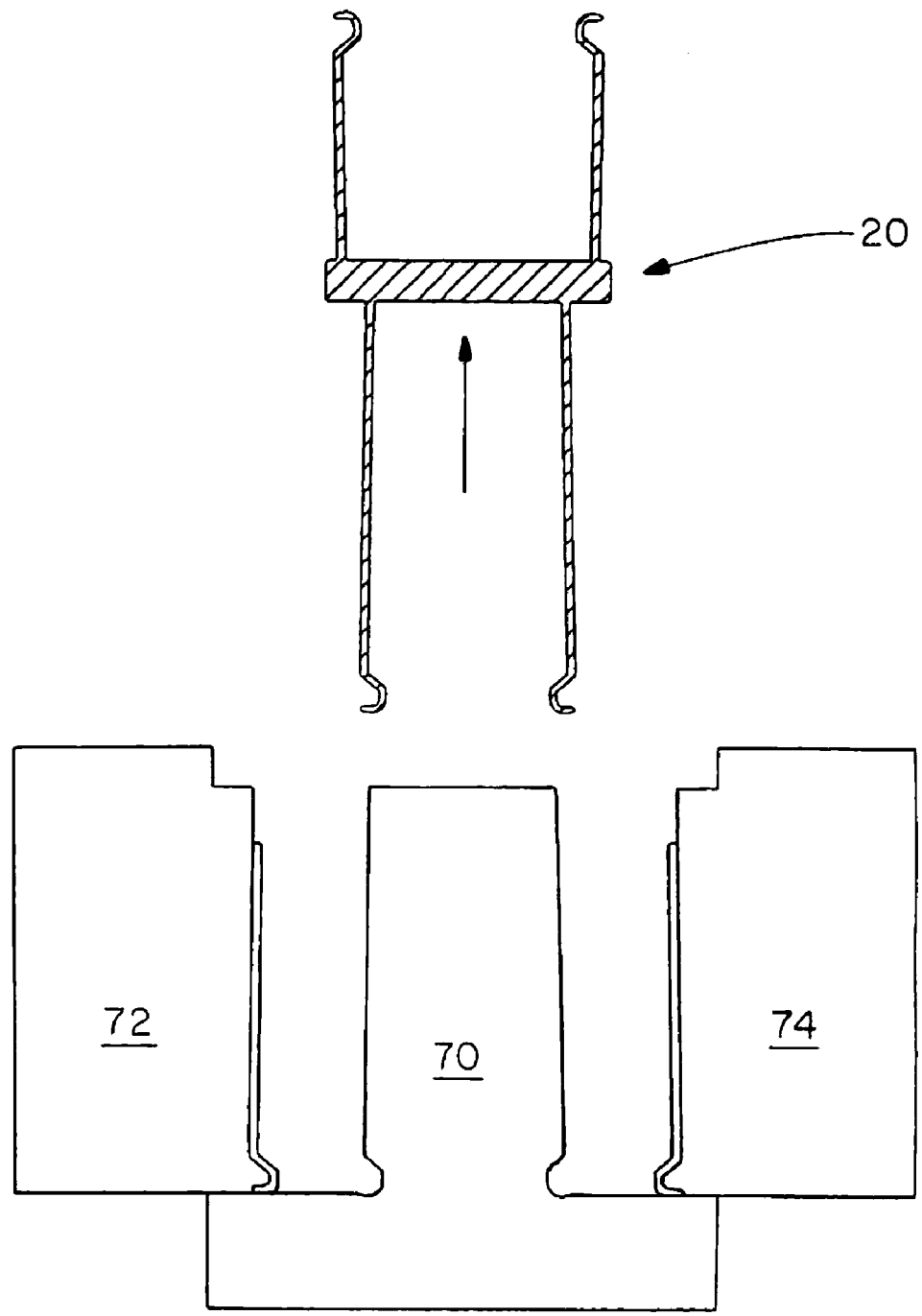
FIG. 20 is a view akin to that of FIG. 19 wherein the molded manager has been dislodged from the lower center die.

Once the upper dies are all withdrawn, the molded piece may not yet be removable from the mold because the curved lips on the rear side walls 26 present the same problem that the lips on the front side walls presented to the upper dies. Therefore, as seen in FIG. 19, the lower left and right dies are next withdrawn laterally from the molded piece to provide clearance for the rear side walls 26 to deflect outwardly when the molded piece is removed from the lower center die (FIG. 20). After the lower left and right dies have provided the clearance, the molded piece may be dislodged or removed from the lower center die by any conventional means.

The embodiments described and shown above are exemplary of preferred embodiments only and are not intended to be an exhaustive representation of the scope of the invention. The invention is defined by the following claims.

We claim:

1. An integrally molded cable manager for routing cables wherein said cable manager is generally enclosable by a cover, said integrally molded cable manager comprising:

a generally rectangular base portion; and a pair of side wall portions generally perpendicular to said base portion along the longer sides of said generally rectangular base portion, each of said side wall portions having a plurality of generally aligned fingers;

at least two fingers of each of said side wall portions including a hook protrusion for cooperating with said cover to permit said cover to be alternately rotatable relative to either of said side wall portions, wherein each of said at least two fingers of each of said side wall portions further includes at least one support rib that contacts said cover when said cover is in a fully open position relative to said manager.

2. The integrally molded cable manager of claim 1, wherein each hook protrusion is positioned on a finger at a distal end of each side wall portion.

3. The integrally molded cable manager of claim 1, wherein each of said at least two fingers of each of said side wall portions includes three support ribs that contact said cover when said cover is in a fully open position relative to said manager.

* * * * *

UNITED STATES PATENT AND TRADEMARK OFFICE
CERTIFICATE OF CORRECTION

PATENT NO. : 7,178,679 B2 Page 1 of 1
APPLICATION NO. : 10/767389
DATED : February 20, 2007
INVENTOR(S) : Mark E. Canty et al.

It is certified that error appears in the above-identified patent and that said Letters Patent is hereby corrected as shown below:

Column 8, Line 33 should read: --and away from the base die. In particular, due to the geometry--

Column 8, Line 54 should read: --formed between the lower center and lower left dies--

Signed and Sealed this

Sixteenth Day of October, 2007

JON W. DUDAS
*Director of the United States Patent and Trademark Office*